R. B. McKINNEY.
HARVESTING SLED.

No. 177,949.                              Patented May 30, 1876.

Witnesses                    Inventor: Robert B. McKinney,
                             By George N. Christy his Atty.

UNITED STATES PATENT OFFICE.

ROBERT B. McKINNEY, OF FOWARD TOWNSHIP, ALLEGHENY COUNTY, PA.

IMPROVEMENT IN HARVESTING-SLEDS.

Specification forming part of Letters Patent No. 177,949, dated May 30, 1876; application filed April 29, 1876.

*To all whom it may concern:*

Be it known that I, ROBERT B. McKINNEY, of Foward township, county of Alleghany, State of Pennsylvania, have invented or discovered a new and useful Improvement in Harvesting-Sleds; and I do hereby declare the following to be a full, clear, concise, and exact description thereof, reference being had to the accompanying drawing, making a part of this specification, in which—like letters indicating like parts—

Figure 1:
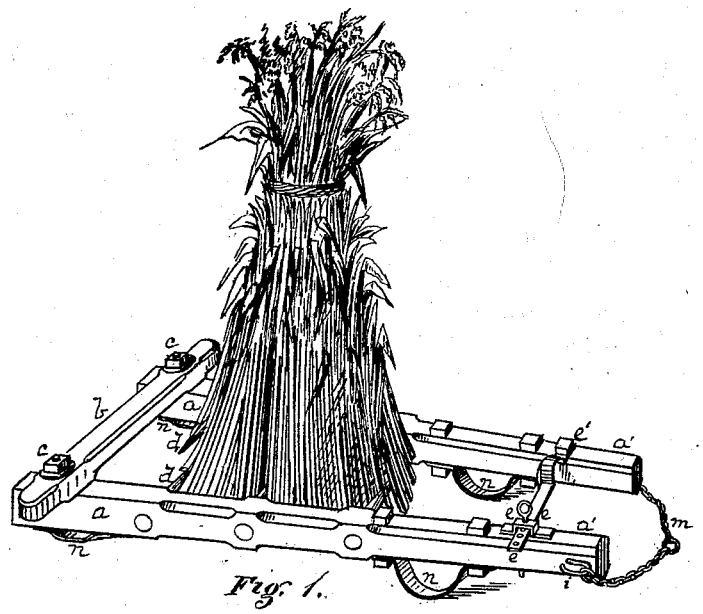
Figure 2:
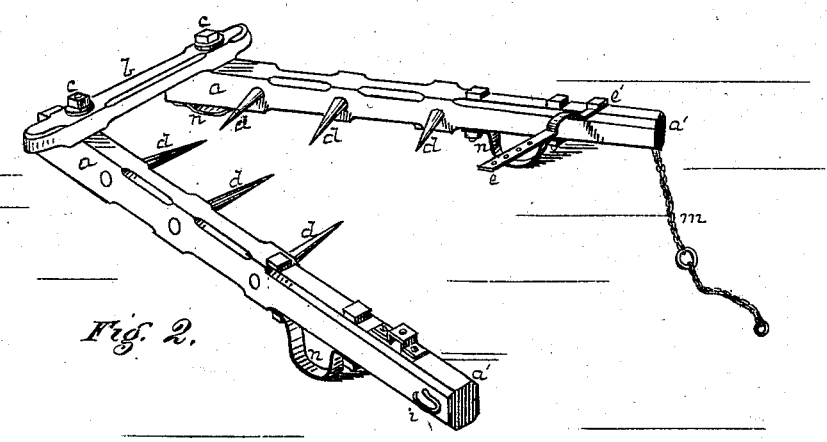

Figure 1 represents my improved harvesting-sled as applied to a shock of corn preparatory to moving the same, and Fig. 2 represents such apparatus adjusted ready to be put in place about the shock.

My improved harvesting-sled is designed for moving shocks of corn, grain, or cocks of hay, when the usual modes of transportation are undesirable or impracticable, and is constructed as follows: Two side bars, $a$ $a'$, of suitable length and size, are connected at one end, as at $a$, by a cross-beam, $b$. This beam $b$ may be secured to the side bars by bolts $c$, or by any manner of joint which will permit the side bars to swing toward or from each other in their common plane. The side bars $a$ $a'$ are armed on their inner adjacent faces with a suitable number of spurs or forks, $d$, which may be of any desired length and size suitable to engage the shock or cock. The ends $a'$ of the side bars are connected by the cross-bar $e$ $e'$, which may be bolted to one of the side bars, as at $e'$, and adjustably connected with the opposite side bar by a pin and staple, as at $e$.

For connecting the draft to this apparatus, hooks $i$ and a chain, $m$, may be attached to one end of the side bars.

In moving shocks of corn it is desirable to raise the apparatus a little from the ground. To effect this shoes $n$ are secured to the under side of the side bars, either by bolts, or in way which will permit the shoes to be removed when desired, as in moving hay it would be desirable to remove them from at least one end of the side bars, or replace them with smaller ones, and for some purposes it is desirable to elevate one end from the ground more than the other.

The operation of my improved harvesting-sled is as follows: The draft-chain $m$ and cross-bar $e$ $e'$ are detached from one of the side bars, and the side bars opened or separated from each other the desired distance. The apparatus is then placed about the shock or thing to be moved, and the side bars moved toward each other against the shock, which is penetrated by the spurs $d$. The shock will thus be kept in an upright position by the combined support of the spurs $d$ and side bars $a$ $a'$. When the side bars are brought sufficiently near together they may be fastened in that position by the cross-bar $e$ $e'$, as described, and upon attaching the draft-chain $m$ the whole may be drawn to the place desired.

The apparatus may then be removed by detaching the chain $m$ and cross-bar $e$ $e'$ and opening out the side bars $a$ $a'$, leaving the shock standing in an upright position, as it was before moving.

In moving shocks of corn by the usual method the stalks are badly broken, and a large part of the leaves, and most valuable part of the fodder, is wasted. With my apparatus the butts of the stalks alone (which are comparatively worthless) are broken, and the valuable parts of the fodder almost wholly preserved, and at the same time one person is able to do, with equal facility, the work which, in the ordinary operation, requires two; and with it hay may be moved readily from ground which is inaccessible with a wagon.

I claim herein as my invention—

1. The side bars $a$ $a'$, having a swinging motion to and from each other, armed with spurs $d$ on their inner adjacent faces, and with end connections for holding them in proper position while their load is being moved, substantially as set forth.

2. In combination with the pivoted bars of a harvesting-sled, the shoes $n$, arranged substantially as and for the purposes set forth.

In testimony whereof I have hereunto set my hand.

ROBERT B. McKINNEY.

Witnesses:
JNO. A. WILSON,
CLAUDIUS L. PARKER.